United States Patent [19]

Freda et al.

[11] Patent Number: 4,731,006

[45] Date of Patent: Mar. 15, 1988

[54] APPARATUS FOR PROCESSING FOOD PRODUCTS

[75] Inventors: Gerald Freda, Palatine; Joseph Bogacz, Chicago; Joseph Freda, Barrington Hills; Dennis Olson, Elgin, all of Ill.

[73] Assignee: C&F Packing Co., Inc., Chicago, Ill.

[21] Appl. No.: 763,034

[22] Filed: Aug. 6, 1985

[51] Int. Cl.[4] ...................... B29C 47/54; B29C 47/66; A23P 1/12

[52] U.S. Cl. ........................................ 425/190; 17/32; 83/425.1; 425/308; 425/376 R

[58] Field of Search ............................ 83/425.1, 425.0; 222/386, 389, 334; 425/376 R, 308, 190; 17/32

[56] References Cited

U.S. PATENT DOCUMENTS

| | | | |
|---|---|---|---|
| 664,021 | 12/1900 | Kopp | 83/425.1 |
| 705,543 | 7/1902 | Phillips | 83/425.1 |
| 949,929 | 2/1910 | Hart | 83/425.1 |
| 1,426,016 | 8/1922 | Smith | 83/425.1 |
| 1,449,040 | 3/1923 | Hämy | 83/425.1 |
| 2,101,755 | 12/1937 | Rosentone et al. | 17/32 |
| 2,670,296 | 2/1954 | Tansley | 17/32 |
| 3,090,075 | 5/1963 | Provenzano et al. | 264/147 |
| 3,311,068 | 3/1967 | Atwood et al. | 17/32 |
| 3,312,997 | 4/1967 | Mekkels | 17/32 |
| 3,333,512 | 8/1967 | Parsons | 92/187 |
| 3,344,752 | 10/1967 | Ilines | 425/308 |
| 3,398,702 | 8/1968 | Behr | 17/32 |
| 4,280,385 | 7/1981 | Kienzl | 83/404.3 |
| 4,473,522 | 9/1984 | Marchesani | 264/145 |
| 4,498,380 | 2/1985 | Maus | 100/98 R |
| 4,498,855 | 2/1985 | Baader | 264/141 |
| 4,612,682 | 9/1986 | Holz | 17/26 |
| 4,612,683 | 9/1986 | Holz | 17/26 |

OTHER PUBLICATIONS

Advertisement in *The National Provisioner*, Feb. 21, 1987.

*Primary Examiner*—Willard E. Hoag

*Attorney, Agent, or Firm*—Niro, Scavone, Haller & Niro, Ltd.

[57] ABSTRACT

An apparatus for processing a cooked food product and producing a plurality of cooked food product portions is disclosed. The method includes the steps of positioning the cooked food product in an extrusion location, extruding the cooked food product through an extrusion plate and dividing the extruded cooked food products into a desired thickness and/or weight. The disclosed apparatus includes a positioning element which positions the cooked food product into an extrusion location, as well as an extrusion assembly which extrudes the cooked food product prior to presenting the extruded food product to the dividing apparatus for division into a plurality of portions having a desired thickness and/or weight. Apparatus is also disclosed for selectively varying the shape of the food product portions, as well as apparatus which provides for selective adjustment of the operational parameters of the apparatus to vary the thickness of the cooked food product portions.

14 Claims, 12 Drawing Figures

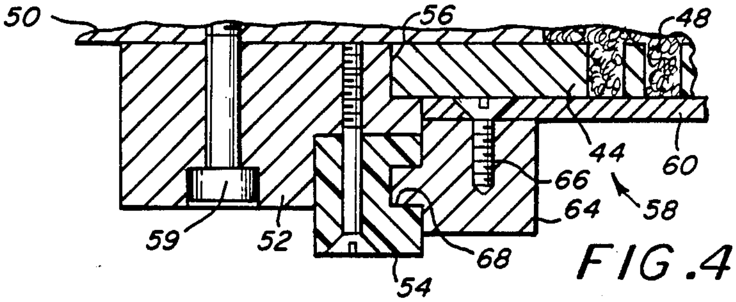
FIG. 4
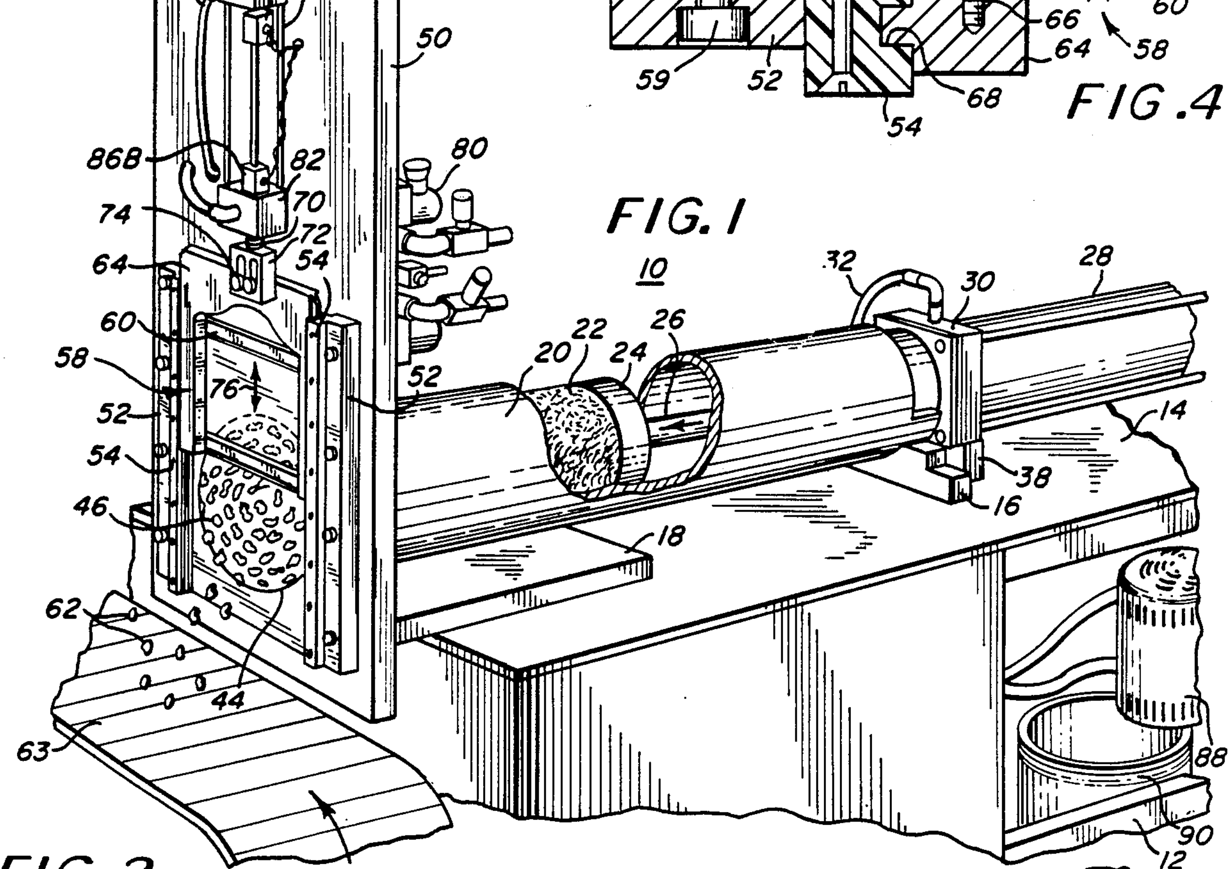
FIG. 1
FIG. 2
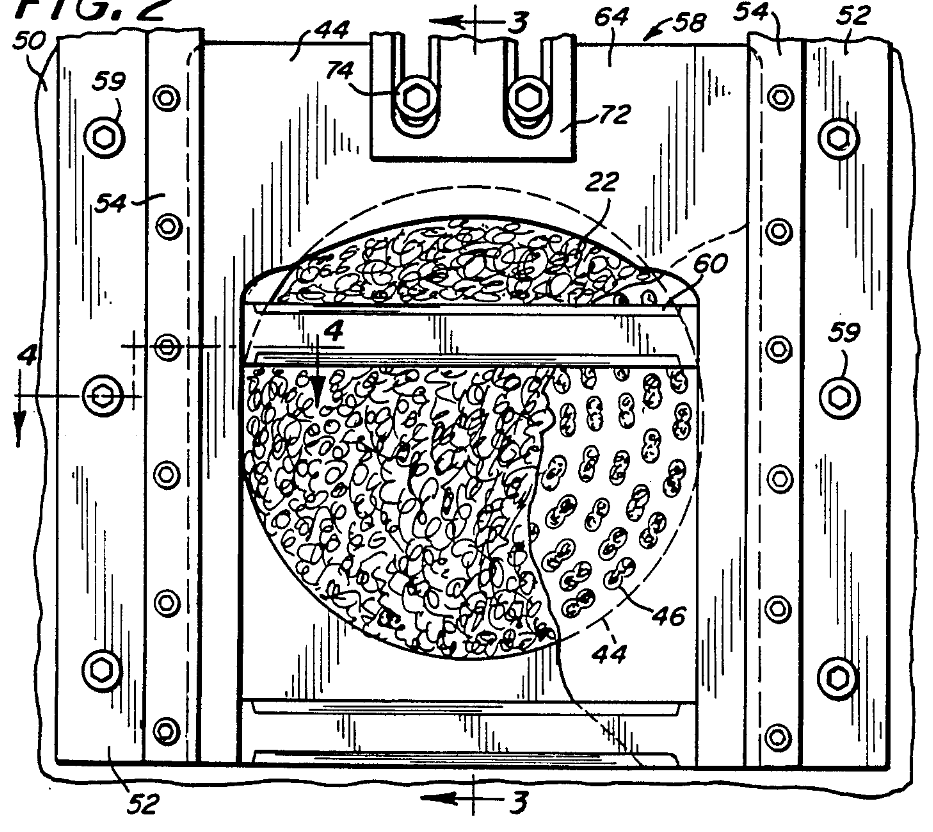
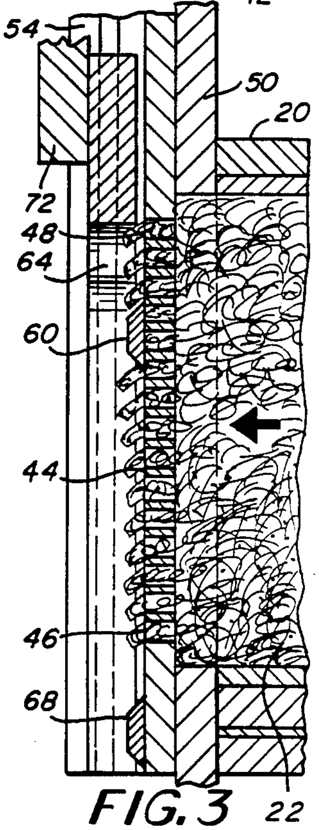
FIG. 3

FIG. 5
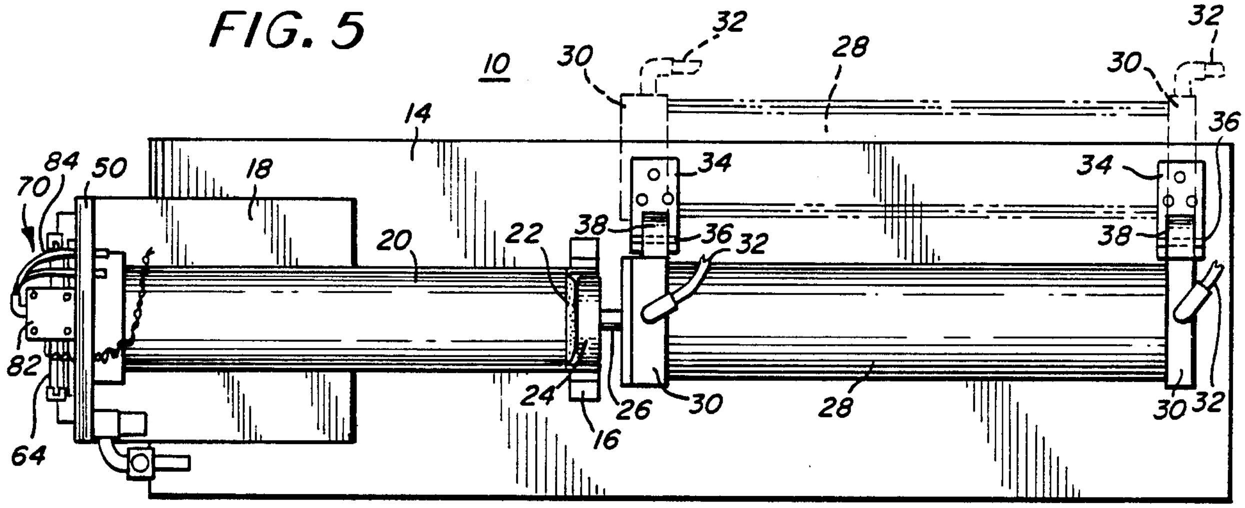
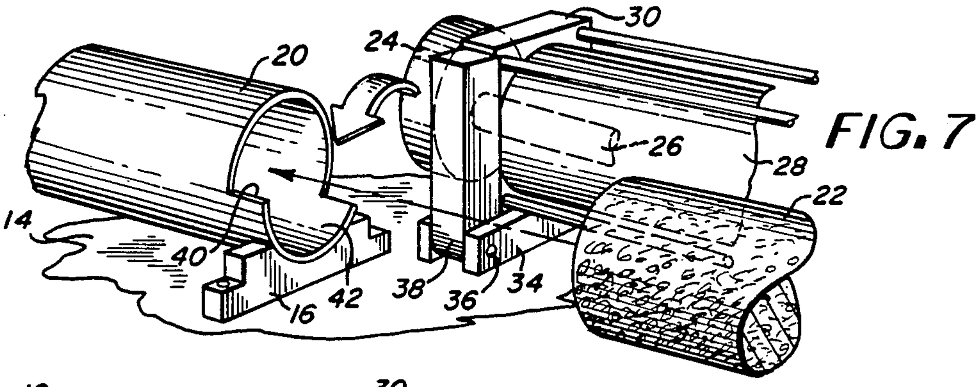
FIG. 7
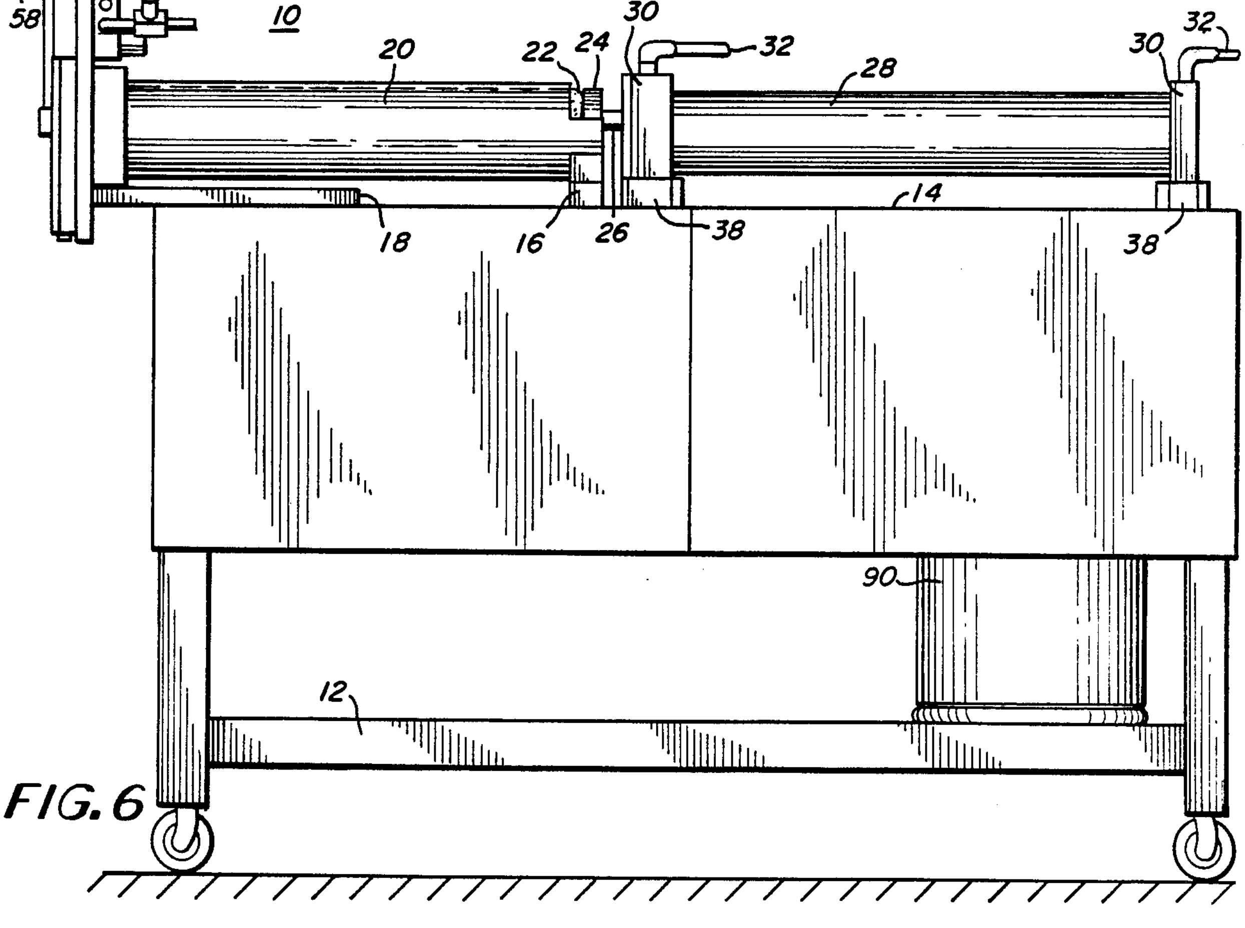
FIG. 6

FIG. 8
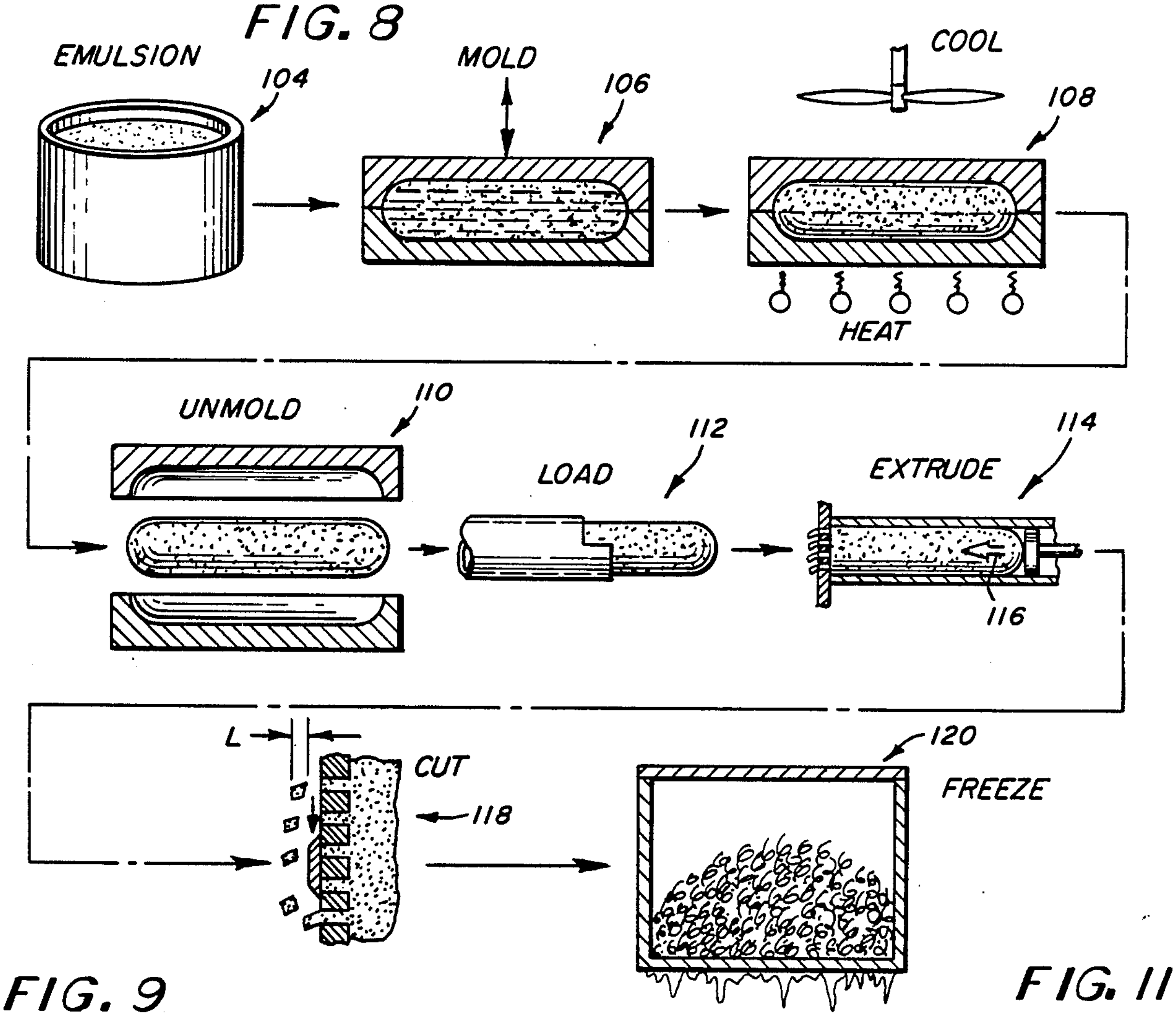
FIG. 11
FIG. 9
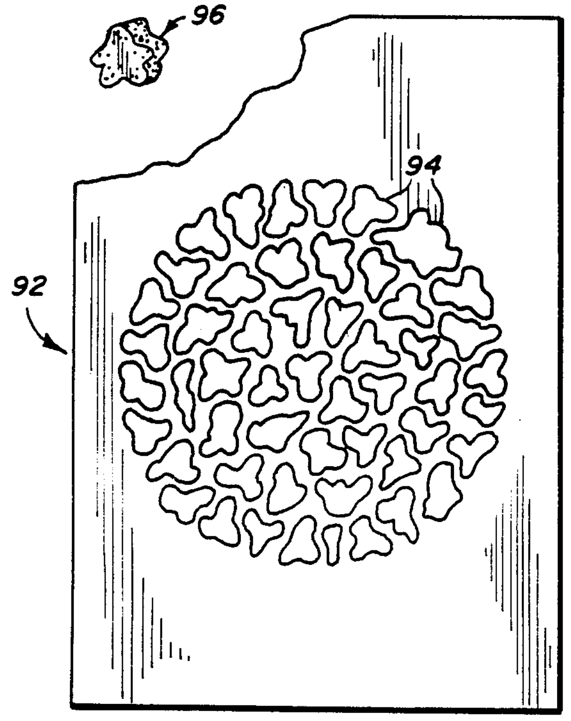
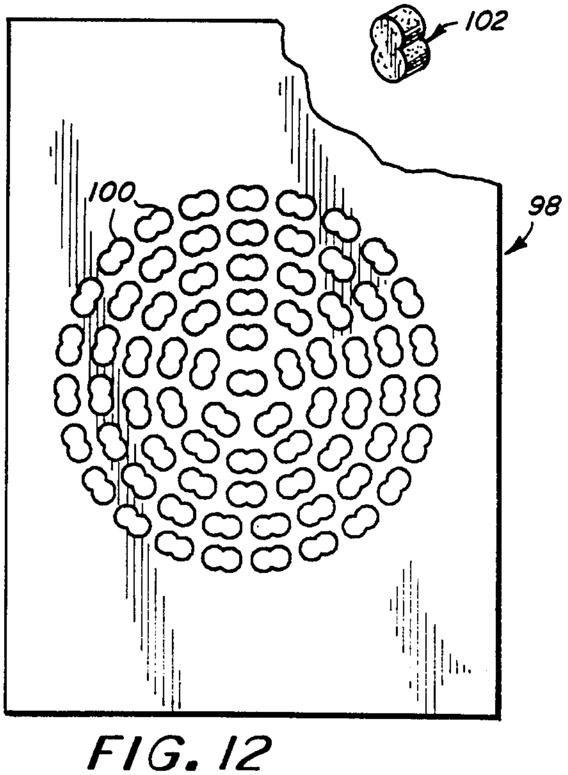
FIG. 10
FIG. 12

APPARATUS FOR PROCESSING FOOD PRODUCTS

TECHNICAL FIELD OF THE INVENTION

The present invention relates to a method and apparatus for processing a food products. More specifically, the invention relates to a method and apparatus for processing a food product into a plurality of food product portions having a predetermined weight.

BACKGROUND OF THE INVENTION

Several devices are known for processing food products. For example, see U.S. Pat. Nos. 4,260,640 to Hartmann et al.; 4,258,066 to Bernard; 4,124,339 to Bernard; and 4,081,564 to Borsuk. These prior art devices relate to extruding and forming food product portions from raw or frozen food mixtures. Such devices do not provide for extruding a cooked food product and cutting the cooked food product to a desired thickness. Further, these prior art devices do not provide for cutting a cooked food product on the other side of an extrusion plate. Such processes and devices typically require the use of high pressure extrusion apparatus in the case of the devices and processes relating to frozen food products, and additional steps as well as material handling problems in the case of devices and processes relating to raw food products. In both cases, such processes and devices have been found to be relatively slow and expensive.

With respect to food products, it has become desirable both in the home and in restaurants, as well as in various other settings to utilize food portioned in predetermined serving sizes which are readily usable in preparing specific food products. For example, it has become desirable to provide serving portions of meat, cheese and similar food product of a predetermined size and weight for topping pizza and similar food items. Further, it has become desirable to provide serving portions consisting of a plurality of discrete food products which may be placed in cooked form directly on the food item being prepared for further cooking. In addition, it is desirable for these food portions to have a particular appearance, that being a particular color, as well as a particular size, shape and thickness. Preferably, these characteristics should be those of a fresh food product having the appearance of being homemade. Specifically, it is desirable to have a food item of random size and shape available which provides the appearance of a hand applied food product which may be precooked.

Consequently, a need has thus developed for a method and apparatus which processes foods products to produce a plurality of food product portions having a predetermined weight. The apparatus and process must not only be fast and cost effective, but must enable the formation of a plurality of different shapes and sizes of food products with very close weight tolerances which have the appearance of being hand formed and which may be precooked prior to processing.

SUMMARY OF THE INVENTION

The present invention has reduced or eliminated the problems associated with devices and processed heretofore known. In accordance with the present invention, a method and apparatus for processing food products into a plurality of food product portions having a selected weight may be formed by positioning the food product in an extrusion location and extruding the cooked food product through an extrusion plate. A plurality of elongated continuous lengths of food product emerge from the extrusion plate which can then be divided into portions having a desired thickness. An apparatus is also provided for positioning the food product into the extrusion location and extruding the food product into a plurality of elongated continuous lengths of cooked food product. The apparatus also includes a dividing or cutting mechanism which severs the elongated continuous lengths of food product into portions of desired thickness on the opposite side of an extrusion plate. Hence, a plurality of food product portions of a desired thickness, and consequently of a predetermined weight, are produced. The extrusion plate includes a plurality of randomly shaped apertures which extrude the food product into a plurality of elongated continuous lengths of randomly shaped food product. These randomly shaped elongated lengths are severed on the opposite side of the extrusion plate forming a plurality of randomly shaped food portions having a uniform thickness and an appearance of being hand formed.

The method and apparatus of the invention also include provisions for varying the rate of extrusion as well as the rate of division of the food product portions, in a manner independent from one another. Adjustability of the rate of extrusion and division of the food product in an independent manner provides selectability of the thickness and weight of the food product portions. In a preferred embodiment, the food product may be a partially or fully cooked food product.

It is, therefore, an object of the present invention to provide a method and apparatus for producing a food product having a selected weight.

It is another object of the present invention to provide a method and apparatus for producing a plurality of food products having a selected weight and thickness.

It is still a further object of the present invention to provide a method and apparatus that can mass-produce a plurality of cooked food products of uniform weight and thickness at low cost by simplified equipment.

It is still a further object of the invention to provide a method and apparatus for producing a plurality of cooked food product portions which allow for variable adjustment of the thickness, and consequently the weight, of the individual food product portions.

Moreover, the method and apparatus for processing the food products into a plurality of food product portions are economical, operate at improve manufacturing speeds and are capable of efficiently manufacturing a plurality of food product portions which have the appearance of being hand formed.

These and other objects of the present invention, together with the advantages thereof, will become apparent to those skilled in the art from the detailed disclosure of the present invention as set forth below.

BRIEF DESCRIPTION OF THE DRAWINGS

FIG. 1 is a perspective view of the apparatus for producing a plurality of food product portions of the present invention;

FIG. 2 is an enlarged fragmentary front elevational view of the food product being extruded through an extrusion plate and divided into a plurality of food product portions on the opposite side thereof;

FIG. 3 is a cross-sectional view taken along line 3—3 of FIG. 2 illustrating the extrusion and division of the food product;

FIG. 4 is fragmentary cross-sectional view taken along line 4—4 of FIG. 2 illustrating the interchangability of the extrusion plate;

FIG. 5 is a top elevational view of the apparatus of FIG. 1;

FIG. 6 is a side elevational view of the apparatus of FIG. 1 illustrating the apparatus mounted to a movable frame member;

FIG. 7 is a enlarged fragmentary perspective view of a portion of the apparatus of FIG. 1 illustrating a loaf of cooked food product being positioned into an extrusion position for processing;

FIG. 8 is a block diagram illustrating the overall continuous process of producing a plurality of cooked food product portions of the invention;

FIG. 9 is a perspective view of one type food product portion produced by the method and apparatus of the invention;

FIG. 10 is a fragmentary front elevational view of the extrusion plate used to produce the food product portion of FIG. 9;

FIG. 11 is a perspective view of a second type of food product portion produced by the method and apparatus of the invention; and FIG. 12 is a fragmentary front elevational view of the extrusion plate used to produce the food product portion of FIG. 11.

DETAILED DESCRIPTION OF THE INVENTION

While this invention is susceptible of embodiment in many different forms, there are shown in the drawings and will herein be described in detail an illustrated embodiment of the invention. It should be understood, however, that the present disclosure is to be considered as an exemplification of the principles of the invention and is not intended to limit the invention to the embodiment illustrated.

Referring now to the drawings in detail, and first to FIGS. 1, 6 and 7, an apparatus or machine for processing food products is illustrated and generally designated 10. To facilitate use and mobility of the machine, frame 12 and associated mounting surface 14 are provided to which the machine 10 is mounted. Mounting of machine 10 to mounting surface 14 is provided through the use of mounting blocks 16 and a mounting bracket 18. While the present invention will be described with respect to processing a cooked food product and a cooked food product loaf, it should be understood that a raw or uncooked food product and food product loaves may be processed in the same manner.

Machine 10 includes a food positioning mechanism which further includes an engaging member, an advancing member and a guide member. As illustrated, the guide member comprises a stainless steel tube 20 into which the cooked food product, preferably a loaf of cooked food product such as food load 22, is placed. Food loaf 22 is advanced through force applied by the engaging member, preferably having a planar surface, such as plate 24. Plate 24 is advanced through tube 20 by an actuator, such as shaft 26. To facilitate advancement of shaft 26, and hence plate 24, a cylinder 28 is operatively associated with shaft 26 which provides movement or reciprocation of the shaft and plate 24 through tube 20 in the directions shown by the single double-headed arrow located on shaft 26. Cylinder 28 is operatively connected through the use of fittings 30 and associated tubing 32.

The loading of food loaf 22 into a location for extrusion is best depicted as illustrated in FIG. 7. Specifically, cylinder 28 including shaft 26 and plate 24 are pivotably through the use of bracket 34, pivot pin 36 and block 38. To facilitate such pivoting, guide tube 20 includes a cut-out portion 40 which allows plate 24, shaft 26, cylinder 28, fittings 30 and tubing 32 to be pivoted from a first position to a second position at one side of said first position and away from guide tube 20 when the plate and actuator 26 are withdrawn from the guide tube. Construction in this manner allows projecting portion 42, on guide tube 20 to be connected to mounting block 16 for mounting to mounting surface 14.

As illustrated in FIG. 5, machine 10 employs two bracket, pivot pin and block combinations to facilitate the pivoting of cylinder 28, shaft 26 and plate 24. Pivoting of the food loaf advancing mechanism is illustrated in phantom line in the right hand portion of FIG. 5.

Cooked food loaf 22 is advanced downline at a continuous rate through guide tube 20, by the variable force exerted through reciprocation of plate 24, toward an extrusion plate 44. Extrusion plate 44 includes a plurality of aperture 46 through which cooked food loaf 22 is forced. As food loaf 22 is extruded through apertures 46, a plurality of elongated continuous lengths of cooked food product 48 are formed.

FIGS. 1, 2 and 4 illustrate extrusion plate 44 mounted to a mounting plate 50 through the use of mounting bars 52 and guide members 54. As can be best seen in FIG. 4, extrusion plate 44 is held in position by an abutment 56 formed in mounting bars 52. A retaining force is maintained on extrusion plate 44 through the use of screws 58 which mount mounting bars 52 to plate 50.

As can be seen in FIGS. 1 and 6, a cutting mechanism 58 is positioned downline and in front of cooked food loaf 22 and extrusion plate 44. Cutting mechanism 58 includes a cutting blade 60 which is reciprocated in front of extrusion plate 44 to sever or cut and divide the elongated lengths of cooked food product into a desired thickness thereby forming a plurality of cooked food product portions 62. The cooked food product portions can then be transmitted for further processing by a conveying mechanism such as conveyor 63.

Cutting blade 60 is mounted to a blade mounting plate 64 through a fastener 66. Blade mounting plate 64 reciprocates in a channel 68 formed in guide members 54.

Reciprocation of blade 60 and associated blade mounting plate 64 is facilitated by an actuator 70. Actuator 70 is fastened to a connecting block 72 which is associated with blade mounting plate 64 through fastener 74. Vertical reciprocation of blade 60, blade mounting plate 64 and actuator 70, as indicated by the two double-headed arrows 76, is effected by a second cylinder 78.

As may be appreciated by one skilled in the art, a variety of cylinders may be provided to perform the cooked food loaf advancing function of cylinder 28, as well as the blade reciprocation function of cylinder 78. Such cylinders may include, but are not limited to hydraulic cylinders, air cylinders or the like. Such cylinders may be selectively regulated through control of the fluid flow, fluid pressure or such similar operational parameter.

Cylinder 78 is connected to a regulating mechanism, such as control valve 80, to provide adjustment of the rate of reciprocation of blade 60 and hence the rate of division of the cooked food product lengths. Such connections is made through fittings 82 and tubing 84. As noted above, adjustment of the rate of reciprocation of blade 60 may be obtained by regulation of the fluid flow or the fluid pressure delivered to cylinder 78.

A sensing mechanism, such as limit switches 86A and 86B, is included to sense and provide a signal indicating the outer positions of travel of actuator 70. The direction of motion of actuator 70 is controlled in relation to the signal supplied by limit switches 86A and 86B. For example when actuator 70 is at the top of its stroke a signal is supplied by limit switch 86A to reverse the direction of travel of the actuator. When actuator 70 reaches the bottom of its stroke, the signal supplied by limit switch 86B again reverses the direction of travel of the actuator. The positioning of limit switches 86A and 86B on cylinder 78 provides selective adjustment of the stroke length of actuator 70 and associated blade 68. It should be understood that such limit switches may sense magnetically, electronically, ultrasonically or in a similar manner.

The combination of selective adjustability of the rate of reciprocation of blade 60, stroke length of actuator 70, as well as selective adjustability of the rate of extrusion of food loaf 22, each independent of one another, provides a full spectrum of adjustment in the thickness, and consequently the weight, of cooked food portions 62. For example, as the stroke length of actuator 70 is lengthened, the rate of reciprocation of actuator 70 reduced, or the rate of extrusion of food loaf 22 increased, the thicker and heavier the cooked food product portions 62. Alternatively, the shorter the stroke length of actuator 70, the higher rate of reciprocation of actuator 70 or the slower the rate of extrusion of food loaf 22, the thinner and lighter the cooked food portions 62.

As noted above, a wide variety of different types of cylinders may be utilized to actuate the apparatus of the invention. A pump, such as hydraulic pump 88 and a reservoir such as tank 90, are necessary to house and recirculate the fluid which actuates machine 10. Such a fluid may include oil, air or similar incompressible fluids.

It may be appreciated by those skilled in the art that a variety of interchangeable extrusion plates 44 may be utilized to vary the appearance of cooked food product portions 62. One such extrusion plate is illustrated in FIG. 10 and generally designated 92. This type of plate includes a plurality of randomly shaped apertures 94 which produce a food product portion generally designated 96 in FIG. 9. This type of extrusion plate is desirable if the food product portion is to take on a hand formed appearance.

A second embodiment of the extrusion plate is illustrated in FIG. 12, generally designated 98, having a plurality of uniform apertures 100. This type of extrusion plate having uniform apertures 100 produces a food product portion 102, illustrated in FIG. 13, which is more uniform in shape than the food product portion 96 produced by extrusion plate 92. It may be appreciated by those skilled in the art that a variety of extrusion plates having a variety of aperture shapes may be provided for use with the method and apparatus of this invention.

As can be seen in FIG. 8, the overall method for producing a plurality of cooked food product portions is illustrated in a step-by-step manner. More specifically, an emulsion is first formed from a combination of ingredients including, but not limited to, a food product, such as meat, cheese or the like, seasonings and flavorings (preferably including salt) and a liquid (preferably water) as illustrated in step 104. The emulsion is put into a mold in step 106 and subsequently heated, for cooking purposes, and cooled in step 108. The mold may include, but is not limited to, a metal, plastic or similar forming member. Preferably, the mold consists of a natural food product casing which is commonly formed from animal intestines or similar casing material. It should be understood that a variety of casing diameters and lengths can be used. Such lengths and diameters include, but are not limited to, the ranges of 20 to 40 inches in length and 8 to 12 inches in diameter. The food product emulsion is heated in the mold or casing to a cooking temperature in the operable range of 137° to 160° Farenheit for a period of approximately from about four (4) to about six (6) hours. Preferably, the emulsion formed into a natural casing is placed in a cooking room or smoke house at a temperature of 140° to 150° Farenheit for the time period of from about four (4) to about six (6) hours thereby completing the cooking step.

Cooling of the cooked food product also takes place while the food product is in the mold or casing. Preferably, the cooked food product loaf is cooled in a cooling area to a temperature within the range of 35° to 40° Farenheit within a time period of from about four (4) to about six (6) hours. Cooling preferably takes place in a cooling area such as a refrigerator or a refrigerated room, and preferably within the same room cooking takes place, having a temperature variable in the range of 30° to 40° Farenheit. Within about a six (6) hour period, the cooked food loaf product is cooled to a temperature in the range of 35° to 40° Farenheit. Preferably in about four (4) to about six (6) hours, the product is cooled to about 40° Farenheit in a cooling area having a temperature in the range of about 30° to about 40° Farenheit.

After the emulsion has been cooked, set, cooled and a cooked food product loaf has been formed in the shape of the mold, the loaf is then removed from the mold in step 110. The cooked and cooled food product loaf is then positioned into an extrusion location on the extrusion apparatus of the present invention in step 112, and extruded in step 114 through the application and maintenance of a selectively variable force, as indicated by arrow 116. The force applied to the cooked food product loaf is variable in the range of about 1,500 to about 13,000 pounds to provide selective adjustment of the rate that the food product is fed through the extrusion apparatus. Forces outside this operation range typically do not allow of a commercially acceptable food product to be produced and do not provide desirable operation of the extrusion apparatus. Preferably, a force in the range of about 10,000 to about 13,000 pounds is utilized to take advantage of the efficiencies and economies associated with the present invention.

In addition, considering the disclosed preferred embodiment of the present invention, force on the food product is selected and maintained such that a volume of cooked food product, also selectively variable in conjunctin with the force, in the range of about 1100 pounds per hour to about 2100 pounds per hour may be extruded. Preferably, a volume of 1500 pounds per hour of cooked food product is extruded. With respect to the disclosed preferred embodiment, a rate slower than 1100 pounds per hour may not fully utilize all of the machine's capabilities, in particular, its cost saving and profitability features. A production rate greater than 2100 pounds per hour produces a cooked food product that may not be commercially acceptable, and which may cause equipment and operation difficulties. It should be understood that the above cited operational parameters are illustrative in nature, and an apparatus having various combinations of operational parameters is contemplated by the present invention.

As force is applied to the food product loaf, the loaf is continuously moved toward the extrusion plate and subsequently extruded therethrough to form a plurality of elongated continuous lengths of cooked food product. The force may be selectively varied to adjust the rate of extrusion as more specifically described above. Immediately on the other side of the extrusion plate, the elongated cooked food product lengths are cut to a desired thickness forming a plurality of cooked food product portions having a unique hand formed appearance. These food product portions are subsequently refrigerated to a desired temperature, which may include freezing, in setp 120. Preferably, the cooked food product portions are frozen in a freezing chamber. The freezing chamber cools the food portions to a temperature in the range of about (+15°) to about (−10°) farenheit in approximately about five (5) to about ten (10) minutes after the cooked food product portions enter the freezing chamber.

More specifically, the elongated lengths of the cooked food product are cut through the use of reciprocating blade positioned on the opposite side of the extrusion plate from the cooked food product loaf, as previously herein described. The rate of reciprocation of the blade, in conjunction with the rate of extrusion, as previously described herein, determines the thickness of the cooked food product portions. Further, the reciprocating action of the blade, in conjunction with the extrusion force maintained on the food product loaf, provides a cutting action which gives the food product portions a hand formed appearance. To obtain the desired thickness a blade reciprocation rate in the range of about fifty (50) to about two hundred twenty five (225) strokes per minute is desired in conjunction with the extrusion rate previously recited of about 1100 to about 2100 pounds per hour. This combination of ranges for blade reciprocation and extrusion rate provides a comercially acceptable product which is used as a food product topping, among other potential uses. Specically, an extrusion rate of about 1500 pounds per hour and a blade reciprocation rate of about one hundred twenty five (125) cycles per minute is one desirable combination which produces satisfactory food product portions of the desired range of thicknesses for use as a food product topping. It may be appreciated by those skilled in the art that a variety of combinations are possible, while still producing a commercially acceptable food product.

The cooked food product portions may be cut into a variety of thicknesses ultimately depending on the desired use of the cooked food product portions. Preferably, the thickness of the cooked food product portions is generally in the range of ¼" (inch) to 1¼" (inches), with the desired thickness falling in the range of ½" (inch) to ¾" (inch). While thicknesses about 1¼" (inches) are usable, such thicknesses produce a food product portion which is heavier and therefore not as desirable for particular commercial uses, namely as a food product topping. Again, it may be appreciated that at step 118, depending on the type of extrusion plate used, the cooked food product portions may take on a variety of shapes, including, but not limited to, random shapes inclding, but not limited to, the shape illustrated in FIG. 9, a clover shape, a figure eight shape, a circular shape and similar random shapes, uniform shapes including, but not limited to, the shape illustrated in FIG. 11, and the like.

While the apparatus and method of the present invention has been described generally with respect to preparing food products and portions thereof, it will be understood by those skilled in the art that the present apparatus and method may be utilized to produce a wide variety of products when it is desirable to form a plurality of discrete product portions having a uniform weight, size, shape and similar characteristics, as well as being formed from a prepared or cooked mass of product or material. It should also be understood that, among other uses, the discrete food product portions may be used as a food product topping which has the appearance of being hand formed and hand applied, while providing a substantial cost savings and operating efficiency. In addition, it should be understood that in relation to preparation of food products, such food products may include, but are not limited to, meat products such as sausage and the like, milk products such as cheese, dough and the like, and other similar food products. Further, while certain ranges of operational parameters have been disclosed herein for illustrative purposes, it should be undetstood that a variety of such parameters are contemplated by this disclosure, including, but not limited to, a variety of combinations of such parameters.

Thus, a unique, cost effective, time saving method and apparatus for processing a cooked food product is provided which is adapted for use in processing a plurality of cooked food product portions. Further, the method and apparatus of the invention provides for formation of cooked food product portions having a variety of shapes, including, but not limited to, randomly shaped portions, uniformly shaped portions and the like, and which may take on a hand formed appearance. In addition, the method and apparatus of the invention provides variable adjustment of a variety of operational parameters to vary the thickness and weight of the individual cooked food product portions.

From the foregoing, it will be appreciated that numerous variations and modifications may be effected without departing from the true spirit and scope of the novel concept of the subject invention. It is to be understood that no limitation with respect to the specific apparatus illustrated herein is intended or should be inferred. It is, of course, intended to cover all such modifications as fall within the scope of the appended claims.

What is claimed is:

1. An apparatus for extruding a food product comprising:

guide means for receiving the food product in a location for extrusion;

means for engaging and advancing the food product through the openings of an extrusion plate in communication with said guide means and at least a portion of one of said guide means and said engaging and advancing means further being pivotally disposed for movement from a first position to a second position at one side of said first position, the axis of said guide means substantially aligned with the axis of said engaging and advancing means in at least one of said first and second positions, said engaging and advancing means being reciprocable within said guide means for moving the food product therethrough; and means at one end of said guide means for successively cutting said extruded food product into a desired thickness.

2. The apparatus of claim 1 wherein the means for successively cutting includes means for cutting said extruded food product into a desired thickness on the opposite side of said extrusion plate.

3. The apparatus of claim 1 wherein said extrusion plate is an interchangeable extrusion plate.

4. The apparatus of claim 1 wherein said food product is cooked food product and said extrusion plate defines a plurality of irregularly shaped apertures therethrough which form a plurality of irregularly shaped elongated continuous lengths of cooked food product during extrusion of said cooked food product through said extrusion plate.

5. The apparatus of claim 1 wherein said means for engaging and advancing includes a planar meat engaging surface and an elongated connecting member operatively associated with said planar food engaging surface.

6. The apparatus of claim 1 wherein said means for engaging and advancing includes an actuator operatively associated therewith.

7. The apparatus of claim 1 wherein said guide means includes a tubular guide member for guiding said food product.

8. The apparatus of claim 1 wherein said means for successively cutting the food product includes reciprocating blade means.

9. The apparatus of claim 8 wherein said reciprocating blade means includes a cylinder and an associated actuator having a blade member attached thereto, said cylinder and associated actuator being selectively adjustable so as to vary at least one of the rate of reciprocation and stroke length of said blade member.

10. The apparatus of claim 1 wherein said means for engaging and advancing includes means for varying the rate of advancement of said food product to vary the weight of said food product after processing.

11. The apparatus of claim 1 wherein said means for successively cutting said extruded food product includes means to vary the rate of division to thereby vary the weight of said food product after processing.

12. An apparatus for producing a plurality of food product portions having a predetermined weight comprising:

a food engaging surface for engaging a food product to be processed;

an actuating member operatively connected to said food engaging surface for moving said food engaging surface to exert force upon and move said food product down line;

a food guide member for guiding said food product during movement downline, at least one of said food engaging surface and said actuating member and said food guide member being movable from a first position to a lateral second position for loading said food product into said food guide member;

an extrusion plate having a plurality of irregularly shaped apertures and positioned downline of said loaded food product towad which said food product is advanced for extrusion into a plurality of elongated irregularly shaped continuous lengths of food product; and a cutting mechanism positioned on the other side of said extrusion plate from said food product for cutting said irregularly shaped lengths of food product into a predetermined width thereby forming a plurality of food products portions which are irregularly shaped and have a predetermined weight.

13. The apparatus of claim 12 wherein said actuating member comprises an adjustable actuating membner providing an adjustable rate of advancement to vary the weight of said plurality of randomly shaped food product portions.

14. The apparatus of claim 12 wherein said cutting mechanism comprises a reciprocating cutting mechanism having an adjustable stroke length and an adjustable stroke rate independent of said stroke length.

* * * * *

UNITED STATES PATENT AND TRADEMARK OFFICE
CERTIFICATE OF CORRECTION

PATENT NO. : 4,731,006

DATED : March 15, 1988

INVENTOR(S) : Joseph Freda, et al

It is certified that error appears in the above—identified patent and that said Letters Patent is hereby corrected as shown below:

Column 1, line 64 "processed" should read --processes--

Column 6, line 67 "conjunctin" should read --conjunction--

Column 7, line 64 "prefrably" should read --preferably--

Column 8, line 8 "inclding" should read --including--

Signed and Sealed this

Twenty-second Day of November, 1988

*Attest:*

DONALD J. QUIGG

*Attesting Officer* *Commissioner of Patents and Trademarks*